United States Patent
Lin et al.

(10) Patent No.: US 12,056,519 B2
(45) Date of Patent: Aug. 6, 2024

(54) VIRTUAL MACHINE MIGRATION METHOD AND APPARATUS

(71) Applicant: Huawei Technologies Co., Ltd., Shenzhen (CN)

(72) Inventors: Jing Lin, Xi'an (CN); Mohua Li, Beijing (CN); Sibiao Luo, Beijing (CN); Hai Deng, Xi'an (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 439 days.

(21) Appl. No.: 17/217,519

(22) Filed: Mar. 30, 2021

(65) Prior Publication Data
US 2021/0216360 A1 Jul. 15, 2021

Related U.S. Application Data (63) Continuation of application No. PCT/CN2019/108586, filed on Sep. 27, 2019.

(30) Foreign Application Priority Data

Sep. 30, 2018 (CN) .......................... 201811161732.3

(51) Int. Cl.
*G06F 9/455* (2018.01)
*G06F 9/48* (2006.01)

(52) U.S. Cl.
CPC ........ *G06F 9/4856* (2013.01); *G06F 9/45558* (2013.01); *G06F 2009/4557* (2013.01)

(58) Field of Classification Search
CPC .................................................. G06F 9/4856
(Continued)

(56) References Cited

U.S. PATENT DOCUMENTS 7,334,157 B1 * 2/2008 Graf .................. G06F 9/4411
714/E11.122
7,356,679 B1 * 4/2008 Le ...................... G06F 16/116
713/1
(Continued)

FOREIGN PATENT DOCUMENTS

CN 103036947 A 4/2013
CN 104572274 A 4/2015
(Continued)

OTHER PUBLICATIONS

"Fstab—Debian Wiki," XP055243962, URL: https://wiki.debian.org/fstab, pp. 1-5 (Retrieved on Jan. 22, 2016).

*Primary Examiner* — Mehran Kamran
(74) *Attorney, Agent, or Firm* — Leydig, Voit & Mayer, Ltd.

(57) ABSTRACT

A virtual machine migration method and apparatus, that the method includes: downloading an image file of a to-be-migrated virtual machine from an object storage; starting a preset command to process the downloaded image file, to obtain a private image corresponding to the image file of the to-be-migrated virtual machine, and provisioning, by using the private image, a virtual machine that runs on a destination virtualization platform, where the preset command is configured based on a difference between a source virtualization platform and the destination virtualization platform. According to the foregoing method, the image file of the to-be-migrated virtual machine is processed by executing the preset command, so that automatic migration of the image file of the to-be-migrated virtual machine can be implemented, and a user does not need to perform a manual operation. This effectively improves migration efficiency and meets a user requirement.

11 Claims, 7 Drawing Sheets

(58) Field of Classification Search
USPC ........................................................ 718/1
See application file for complete search history.

(56) References Cited

U.S. PATENT DOCUMENTS

| | | | | |
|---|---|---|---|---|
| 8,990,804 | B1* | 3/2015 | Lissack | G06F 9/45533 |
| | | | | 718/1 |
| 9,104,457 | B2* | 8/2015 | Baset | G06F 9/45533 |
| 9,202,058 | B1* | 12/2015 | Yen | G06F 21/60 |
| 9,521,198 | B1* | 12/2016 | Agarwala | G06F 3/061 |
| 10,606,625 | B1* | 3/2020 | Belianski | G06F 3/0644 |
| 11,669,409 | B2* | 6/2023 | Wang | G06F 11/203 |
| | | | | 714/19 |
| 2007/0006205 | A1* | 1/2007 | Kennedy | G06F 8/63 |
| | | | | 717/174 |
| 2007/0226795 | A1* | 9/2007 | Conti | G06F 21/554 |
| | | | | 726/22 |
| 2008/0126785 | A1* | 5/2008 | Chong | G06F 9/4401 |
| | | | | 713/1 |
| 2008/0201414 | A1* | 8/2008 | Amir Husain | G06F 9/45558 |
| | | | | 709/203 |
| 2009/0282404 | A1* | 11/2009 | Khandekar | G06F 9/45558 |
| | | | | 718/1 |
| 2011/0106929 | A1* | 5/2011 | Lee | G06F 9/45533 |
| | | | | 718/1 |
| 2013/0139155 | A1* | 5/2013 | Shah | G06F 9/45558 |
| | | | | 718/1 |
| 2014/0052877 | A1* | 2/2014 | Mao | H04L 12/4641 |
| | | | | 709/245 |
| 2014/0297780 | A1* | 10/2014 | Zhou | H04L 67/5681 |
| | | | | 709/216 |
| 2015/0113531 | A1* | 4/2015 | Lv | G06F 9/4856 |
| | | | | 718/1 |
| 2015/0261514 | A1* | 9/2015 | Fu | G06F 8/63 |
| | | | | 718/1 |
| 2015/0324216 | A1* | 11/2015 | Sizemore | G06F 9/45558 |
| | | | | 718/1 |
| 2017/0024246 | A1* | 1/2017 | Gopalan | G06F 12/1009 |
| 2018/0203719 | A1* | 7/2018 | Zhang | G06F 8/52 |
| 2019/0140905 | A1* | 5/2019 | Vembuli | H04L 41/0889 |
| 2019/0354675 | A1* | 11/2019 | Gan | G06F 11/0712 |
| 2020/0026473 | A1* | 1/2020 | Wo | G06F 3/0664 |
| 2020/0192724 | A1* | 6/2020 | Wang | G06F 9/5077 |
| 2021/0216360 | A1* | 7/2021 | Lin | G06F 9/4856 |

FOREIGN PATENT DOCUMENTS

| | | |
|---|---|---|
| CN | 105159760 A | 12/2015 |
| CN | 106201653 A | 12/2016 |
| CN | 106201702 A | 12/2016 |
| CN | 106406979 A | 2/2017 |
| CN | 106569876 A | 4/2017 |
| CN | 106775922 A | 5/2017 |
| CN | 107102890 A | 8/2017 |
| CN | 107656797 A | 2/2018 |
| CN | 107678831 A | 2/2018 |
| CN | 108255574 A | 7/2018 |
| CN | 109522088 A | 3/2019 |

* cited by examiner

| | | |
|---|---|---|
| * Source | ECS | Image file |
| * Image type | ECS system disk image | BMS system disk image |
| * Image file | cirros-0.3.0-x86_64-disk.img | Select |

> Details of the image file
>
> File name: cirros-0.3.0-x86_64-disk.img
> File size: 9.31 MB
> File path: ims-teste/cirros-0.3.0-x86_64-disk.img ☐ Image file initial configuration completed  Learn more

| | | |
|---|---|---|
| OS | Other ▾ | (64 bit) ▾ |

If the OS in the image file is different from the one you selected, the OS in the image file will be used to create the image. If IMS fails to detect the OS in the image file, the one you selected will be used to create the image.

| | | |
|---|---|---|
| * System disk (GB) | − 40 + | Ensure that the system disk size is greater than the image file size. |
| * Name | test | |
| Encryption | ☐ KMS encryption (?) | |
| Tag | It is recommended that you use TMS's predefined tag function to add the same tag to different cloud resources. | |
| | Tag key   Tag value | |
| | You can add 10 more tags. | |
| Description | | |
| | 0/1024 | |

▮ Enable automatic configuration  Learn more

VIRTUAL MACHINE MIGRATION METHOD AND APPARATUS

CROSS-REFERENCE TO RELATED APPLICATIONS

This application is a continuation of International Application No. PCT/CN2019/108586, filed on Sep. 27, 2019, which claims priority to Chinese Patent Application No. 201811161732.3, field on Sep. 30, 2018. The disclosures of the aforementioned applications are hereby incorporated by reference in their entireties.

TECHNICAL FIELD

This application relates to the field of virtualization technologies, and in particular, to a virtual machine migration method and apparatus.

BACKGROUND

As virtualization technologies become increasingly mature, many mature open-source virtualization technologies emerge, for example, open-source virtualization technologies such as a kernel-based virtual machine (KVM) and an open-source code virtual machine monitor (XEN). On this basis, cloud computing develops rapidly, and major vendors invest funds and technical resources to develop their own cloud products.

However, because different vendors may use different virtualization technologies at underlayers of products, a new requirement emerges, namely, V2V (virtual-to-virtual) virtual machine migration. Static migration is a main manner used for the V2V virtual machine migration. The static migration is also referred to as common migration or offline migration, which means that a virtual machine is migrated from a physical machine to another physical machine when the virtual machine is shut down or suspended. A file system of the virtual machine is established on a virtual machine image. Therefore, when the virtual machine is shut down, the virtual machine image and a corresponding configuration file only need to be simply migrated to another physical host. If a status of the virtual machine before the migration needs to be saved, the virtual machine is suspended before the migration, the status is copied to a destination host, the status of the virtual machine is rebuilt on the destination host, and then the virtual machine resumes running.

Because a same virtual machine platform has a same implementation technology and an application programming interface (API) interface, the foregoing static migration can be easily implemented. However, because underlying implementation technologies may be different, it is difficult to implement cross-platform offline migration of the virtual machine, and further research is needed.

SUMMARY

In view of this, this application provides a virtual machine migration method and apparatus, to implement automatic migration of a virtual machine and improve migration efficiency of the virtual machine.

According to a first aspect, an embodiment of this application provides a virtual machine migration method. The method includes:
downloading an image file of a to-be-migrated virtual machine from an object storage (OBS); starting a preset command to process the downloaded image file, to obtain a private image corresponding to the image file, where the preset command is configured based on a difference between a source virtualization platform and a destination virtualization platform, the source virtualization platform is a virtualization platform on which the to-be-migrated virtual machine is located before migration, and the destination virtualization platform is a virtualization platform to which the to-be-migrated virtual machine is to be migrated; and provisioning, by using the private image, a virtual machine that runs on the destination virtualization platform.

In this way, the image file of the to-be-migrated virtual machine is processed by executing the preset command, so that automatic migration of the image file of the to-be-migrated virtual machine can be implemented, and a user does not need to perform a manual operation. This effectively improves migration efficiency and meets a user requirement.

In an embodiment, the starting a preset command to process the image file of the to-be-migrated virtual machine includes: modifying a disk partition name of the image file to a universally unique identifier (UUID) of a disk partition; and/or converting a format of the image file into a preset format.

In an embodiment, an operating system of the to-be-migrated virtual machine is a Linux operating system; and the starting a preset command to process the image file further includes: when it is detected that an initrd file of the image file does not include a driver file required by the destination virtualization platform, loading the driver file required by the destination virtualization platform.

In an embodiment, an operating system of the to-be-migrated virtual machine is a Windows operating system; and the starting a preset command to process the image file further includes: offline importing a driver file required by the destination virtualization platform into a registry of the image file.

In an embodiment, before the starting a preset command to process the image file, the method further includes: determining that information about the image file of the to-be-migrated virtual machine passes a validity check, where the information about the image file includes at least one of the following: a size of the image file and a system disk size of the image file.

In an embodiment, the source virtualization platform includes any one of a VMware virtualization platform, a virtual server virtualization platform, an open-source code virtual machine monitor XEN virtualization platform, and a kernel-based virtual machine (KVM) virtualization platform; and the destination virtualization platform includes the XEN virtualization platform and/or the KVM virtualization platform.

According to a second aspect, an embodiment of this application provides a virtual machine migration apparatus. The apparatus has a function of implementing the method in the possible designs of the first aspect. The function may be implemented by hardware, or by hardware executing corresponding software. The hardware or software includes one or more modules corresponding to the foregoing function, for example, a downloading module, a processing module, and a provisioning module. The downloading module is configured to download an image file of a to-be-migrated virtual machine from an object storage OBS. The processing module is configured to start a preset command to process the downloaded image file, to obtain a private image corresponding to the image file of the to-be-migrated virtual machine, where the preset command is configured based on a difference between a source virtualization platform and a destination virtualization platform, the source virtualization platform is a virtualization platform on which the to-be-migrated virtual machine is located before migration, and the destination virtualization platform is a virtualization platform to which the to-be-migrated virtual machine is to be migrated. The provisioning module is configured to provision, by using the private image, a virtual machine that runs on the destination virtualization platform.

In an embodiment, the processing module is specifically configured to: modify a disk partition name of the image file to a universally unique identifier UUID of a disk partition; and/or convert a format of the image file into a preset format.

In an embodiment, when an operating system of the to-be-migrated virtual machine is a Linux operating system, the processing module may be specifically configured to: when it is detected that an initrd file of the image file does not include a driver file required by the destination virtualization platform, load the driver file required by the destination virtualization platform.

In an embodiment, when an operating system of the to-be-migrated virtual machine is a Windows operating system, the processing module may be specifically configured to: offline import a driver file required by the destination virtualization platform into a registry of the image file.

In an embodiment, before starting the preset command to process the image file of the to-be-migrated virtual machine, the processing module is further configured to: determine that information about the image file of the to-be-migrated virtual machine passes a validity check, where the information about the image file includes at least one of the following: a size of the image file and a system disk size of the image file.

In an embodiment, the source virtualization platform includes any one of a VMware virtualization platform, a virtual server virtualization platform, an open-source code virtual machine monitor XEN virtualization platform, and a kernel-based virtual machine (KVM) virtualization platform; and the destination virtualization platform includes the XEN virtualization platform and/or the KVM virtualization platform.

According to a third aspect, an embodiment of this application provides a virtual machine migration apparatus. The apparatus includes a processor and a memory, where the memory stores a computer-executable instruction, and when the apparatus runs, the processor executes the computer-executable instruction stored in the memory, to enable the apparatus to perform the method according to various possible designs of the first aspect.

According to a fourth aspect, an embodiment of this application further provides a computer-readable storage medium. The computer-readable storage medium stores an instruction. When the instruction is run on a computer, the computer is enabled to perform the method according to any one of the possible designs of the first aspect.

According to a fifth aspect, this application further provides a computer program product including an instruction. When the computer program product runs on a computer, the computer is enabled to perform the method according to any possible design of any one of the first aspect to the fifth aspect.

These aspects or other aspects in this application may be clearer and more intelligible in descriptions in the following embodiments.

DESCRIPTION OF EMBODIMENTS

The following further illustrates the embodiments of this application in detail with reference to drawings of this specification.

Generally, cross-platform offline migration of a virtual machine is generally implemented in a semi-automatic mode. For example, for a Linux virtual machine (in other words, an operating system of the virtual machine is a Linux operating system), a customer uninstalls a platform tool on a source virtualization platform, manually sets a system startup file and file system mounting, manually loads a virtualization driver that may be required, encapsulates an image, and attempts to migrate the virtual machine to a destination virtualization platform. For a Windows virtual machine (in other words, an operating system of the virtual machine is a Windows operating system), a customer uninstalls a platform tool on a source virtualization platform, installs a platform tool on a destination virtualization platform, manually loads a registry, manually deals with file system mounting and a network driver, encapsulates an image, and attempts to migrate the virtual machine to the destination virtualization platform.

According to the foregoing description, the offline migration cannot be automatically implemented currently. Implementation efficiency is low and a customer requirement cannot be met. Based on this, an embodiment of this application provides a virtual machine migration method, to improve virtual machine migration efficiency.

Figure 1:
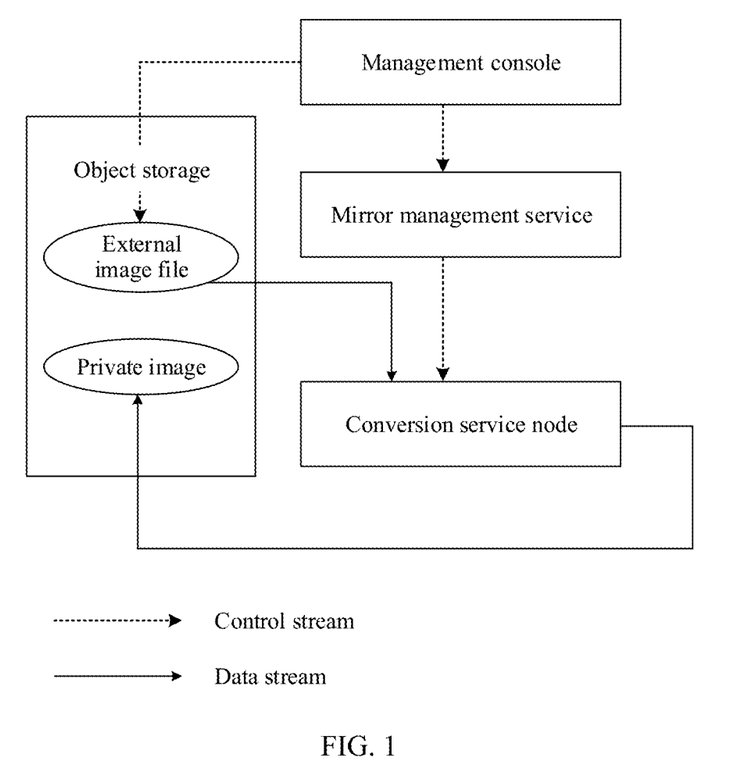
FIG. 1 is a schematic diagram of a system architecture to which an embodiment of this application is applicable.

FIG. 1 is a schematic diagram of a system architecture to which an embodiment of this application is applicable. As shown in FIG. 1, the system architecture includes a management console, an image management service (IMS), an object storage (OBS), and a conversion serving node.

The management console is configured to provide an interface that can be operated by a user. For example, the user may select, on the interface provided by the management console, an image file to register a private image, enter basic information of the image file, and determine whether to perform automatic V2V processing. The image file (or an image) is a cloud server or bare metal server template that includes software and necessary configurations. The cloud server or bare metal server template includes an operating system or service data, and may also include application software (such as database software) and private software. The image is classified into a public image, a private image, and a shared image. The public image is an image provided by a system by default. The private image is an image created by the user. The shared image is a private image shared by another user. The embodiments of this application focus on researching how to convert an external image file into a private image.

The image management service provides an easy-to-use self-service image management function. The user can flexibly and conveniently use the public image, the private image, or the shared image to apply for a clod server or a bare metal server. In addition, the user can also create a private image by using an external image file.

The object storage can be used to store an external image file uploaded by a user and a private image generated after system processing.

The conversion serving node is configured to convert the external image file into the private image. Specifically, a function performed by the conversion serving node may include converting a format of the external image file, and the like.

It should be noted that FIG. 1 shows only main function nodes involved in a process of converting the external image file into the private image file. In specific implementation, another function node, for example, a function node for creating a virtual machine, may further be included in FIG. 1. This is not specifically limited.

Figure 2A:
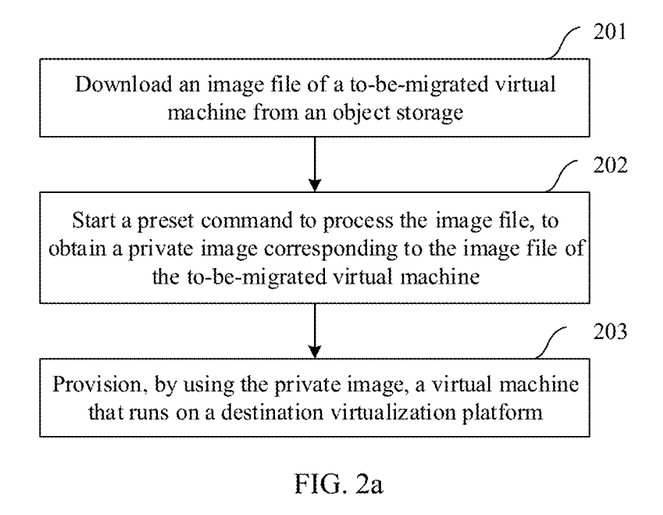
FIG. 2a and FIG. 2b are respectively schematic flowcharts corresponding to a virtual machine migration method according to an embodiment of this application.
Figure 2B:
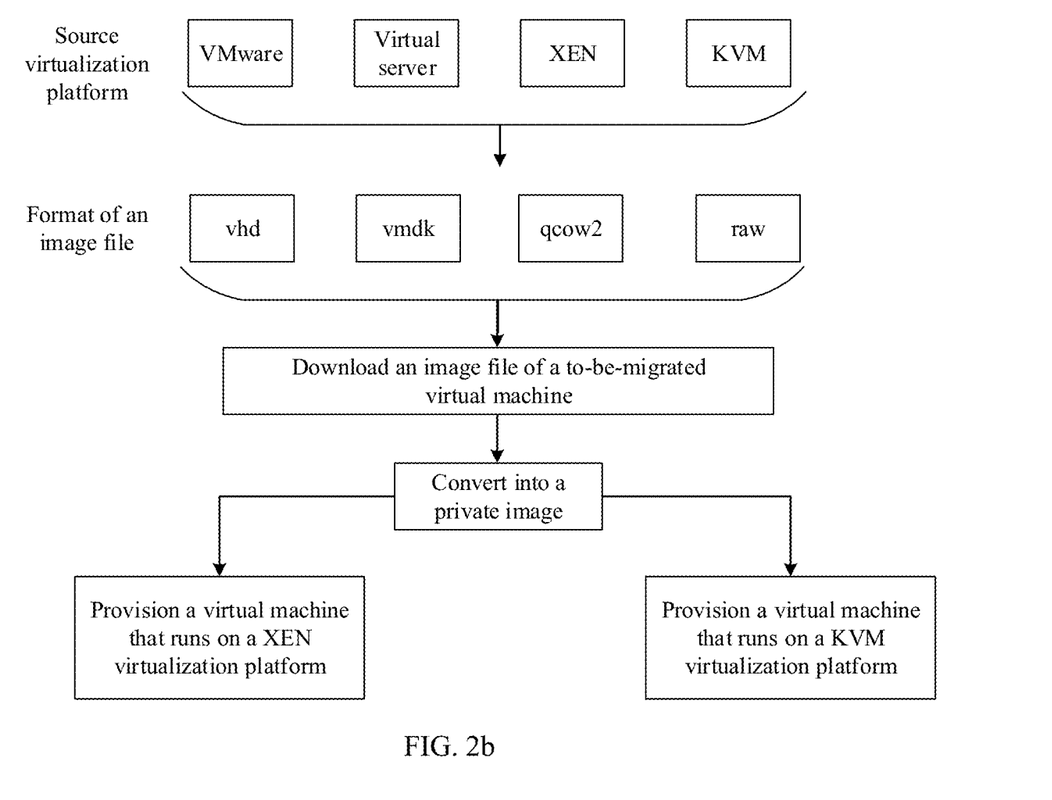

FIG. 2a and FIG. 2b are respectively schematic flowcharts corresponding to a virtual machine migration method according to an embodiment of this application. As shown in FIG. 2a, the method includes the following steps.

Step 201: Download an image file of a to-be-migrated virtual machine from an object storage. This step may be performed by the conversion serving node shown in FIG. 1.

Herein, the image file of the to-be-migrated virtual machine may be downloaded from the object storage. Before step 201, the management console may export the image file of the to-be-migrated virtual machine from a source virtual machine platform according to an operation instruction of a user, and upload the image file of the to-be-migrated virtual machine to the object storage.

The source virtualization platform is a virtualization platform on which the to-be-migrated virtual machine is located before migration. The source virtualization platform may include any one of a VMware virtualization platform, a virtual server virtualization platform, a XEN virtualization platform, and a KVM virtualization platform (as shown in FIG. 2b). It can be understood that the source virtualization platform may also be another virtualization platform. Formats of image files on different virtualization platforms may be different. In an example, a format of the image file of the to-be-migrated virtual machine that can be supported in this embodiment of this application includes: vhd, vmdk, qcow2, raw, vhdx, qcow, vdi, qed, zvhd, zvhd2, or the like (FIG. 2b shows only some possible formats). If the format of the image file of the to-be-migrated virtual machine is a format other than the foregoing described format, a qemu-img tool may be used to convert the format of the image file, and then the converted image file is uploaded to the object storage. The vhd format indicates a Microsoft virtual disk format (microSoft virtual hard disk format). The qcow2 format indicates one of disk image formats supported by qemu and is usually applied to the KVM virtualization platform. The vmdk format indicates a virtual disk format created on the VMware virtualization platform. Other formats are not described here.

Step 202: Start a preset command to process the downloaded image file, to obtain a private image corresponding to the image file of the to-be-migrated virtual machine, where the preset command is configured based on a difference between a source virtualization platform and a destination virtualization platform, and the destination virtualization platform is a virtualization platform to which the to-be-migrated virtual machine is to be migrated; and in an example, the virtualization platform may include the XEN virtualization platform and/or the KVM virtualization platform. This step may be performed by the conversion serving node shown in FIG. 1.

Herein, in an example (for ease of description, Example 1 for short), the starting a preset command to process the downloaded image file may include: modifying a disk partition name of the image file to a universally unique identifier (UUID) of a disk partition. Specifically, a blkid command may be used to query the image file to obtain the UUID of the disk partition. Then, a disk partition identifier used in a system startup file (/etc/grub/grub.conf) is replaced with the UUID of the disk partition queried by using the blkid command, and a disk partition identifier in a system startup disk automatic mounting file (/etc/fstab) is replaced with the UUID of the disk partition queried by using the blkid command.

In still another example (for ease of description, Example 2 for short), if an operating system of the to-be-migrated virtual machine is a Linux operating system, the starting a preset command to process the downloaded image file may further include: checking whether an initrd file of the image file includes a driver file required by the destination virtualization platform, and if the initrd file of the image file does not include the driver file required by the destination virtualization platform, loading the driver file required by the destination virtualization platform. For example, whether the initrd file in the image file includes a XEN driver and a virtio driver may be checked, and if the initrd file in the image file does not include the XEN driver and the virtio driver, the XEN driver and the virtio driver are loaded.

In still another example (for ease of description, Example 3 for short), if an operating system of the to-be-migrated virtual machine is a Windows operating system, the starting a preset command to process the downloaded image file may further include: offline importing a driver file required by the destination virtualization platform into a registry of the image file. The technology of offline importing into the registry may be used to implement that a driver can take effect without logging in by the user, to achieve optimal performance. Further, a service startup technology or another possible technology may be used in combination. This is not specifically limited.

In still another example (for ease of description, Example 4 for short), the starting a preset command to process the downloaded image file may include: converting a format of the image file into a preset format by using a preset tool. Specifically, the qemu-img tool may be started to convert the format of the image file. For example, the format of the image file may be converted into zvhd.

It should be noted that (1) in a possible embodiment, the process in Example 1 may be first performed, then the process in Example 2 is performed, and the process in Example 4 is performed, to convert an image file of a Linux virtual machine into a private image. In still another possible embodiment, the process in Example 1 may be first performed, then the process in Example 3 is performed, and the process in Example 4 is performed, to convert an image file of a Windows virtual machine into a private image. (2) The foregoing Example 1 to Example 4 are merely some example processing manners provided based on a possible difference between the source virtualization platform and the destination virtualization platform. In another possible embodiment, the preset command may further be configured based on another possible difference between the source virtualization platform and the destination virtualization platform, so that automatic migration of the image file of the virtual machine is effectively implemented.

Before the preset command is started to process the downloaded image file, because the format of the image file that is of the to-be-migrated virtual machine and that is downloaded from the object storage may be: vhd, vmdk, raw, vhdx, qcow, vdi, qed, zvhd, zvhd2, or the like, the format of the image file may be converted by using the qemu-img tool, for example, converting the format into qcow2. Therefore, the image file can be easily mounted, and a specific conversion command may be: "qemu-img convert -f vhd -O qcow2 xxx.vhd xxx.qcow2". It should be noted that if the format of the image file is converted into qcow2, the format of the image file in Example 4 can be converted from qcow2 to zvhd.

Further, in this embodiment of this application, validity check may further be performed on information about the image file of the to-be-migrated virtual machine. If the validity check is passed, the preset command may be started to process the image file of the to-be-migrated virtual machine. If the validity check is not passed (or the validity check fails), it can be determined that the private image fails to be created. In an example, the information about the image file includes a size of the image file and a system disk size of the image file. The performing validity check on the information about the image file may be: determining whether the size of the image file exceeds a first preset range, and determining whether the size of the system disk of the image file exceeds a second preset range. If neither the size of the image file nor the size of the system disk of the image file exceeds the preset range, the validity check is passed. If either the size of the image file or the size of the system disk of the image file exceeds the preset range, the validity check fails. The first preset range may be obtained based on a processing capability of the conversion serving node, and the second preset range may be set by the user. This is not specifically limited in this embodiment of this application.

Step 203: Provision, by using the private image, a virtual machine that runs on the destination virtualization platform. Herein, the private image may be used to provision a virtual machine that runs on the XEN virtualization platform, or the private image may be used to provision a virtual machine that runs on the KVM virtualization platform, as shown in FIG. 2b.

In this embodiment of this application, the image file of the to-be-migrated virtual machine is processed by executing the preset command, so that the automatic migration of the image file of the to-be-migrated virtual machine can be implemented, and the user does not need to perform a manual operation. This effectively improves migration efficiency and meets a user requirement.

Figure 3A:
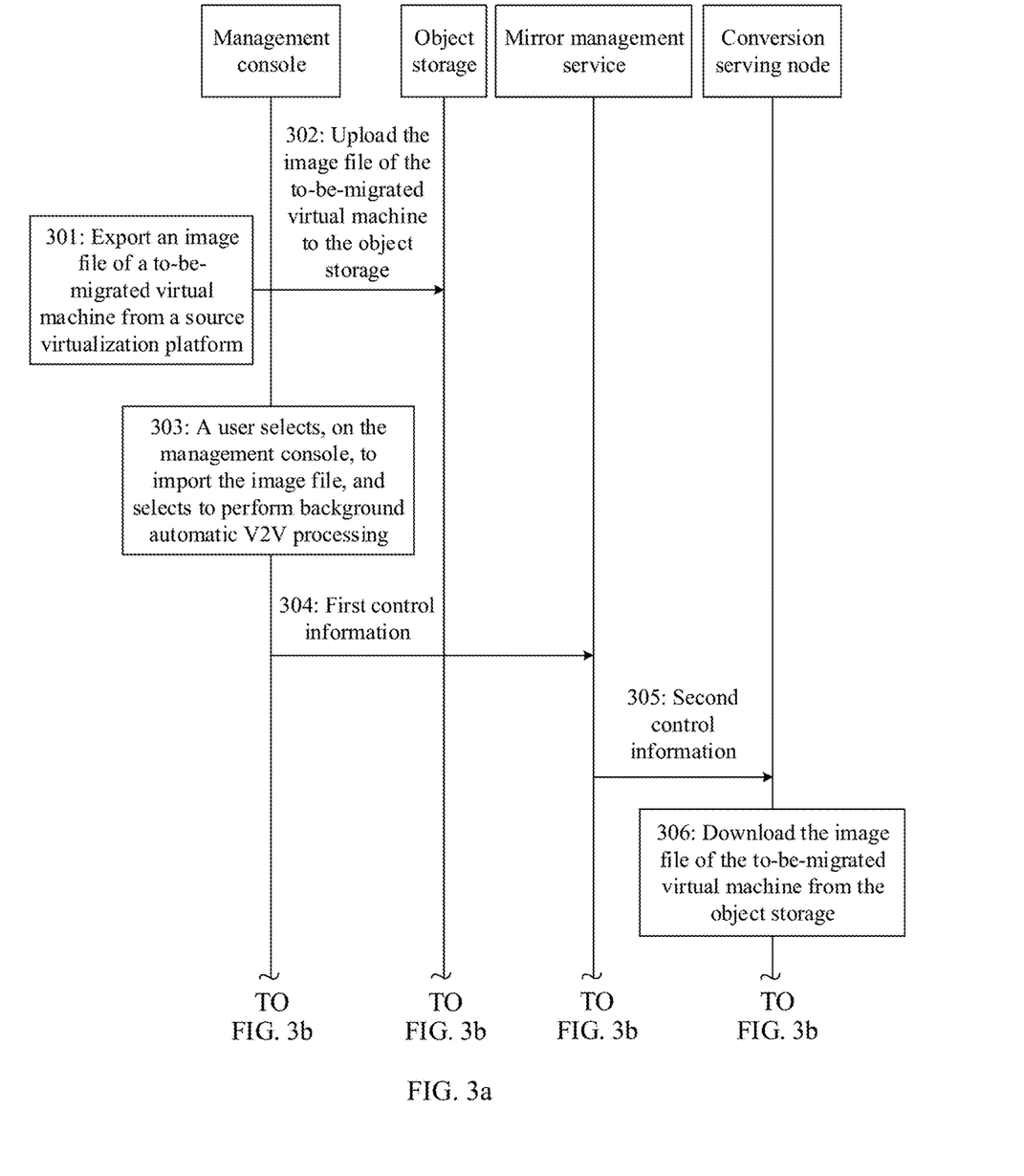
FIG. 3a and FIG. 3b are overall schematic flowcharts of a virtual machine migration method according to an embodiment of this application.
Figure 3B:
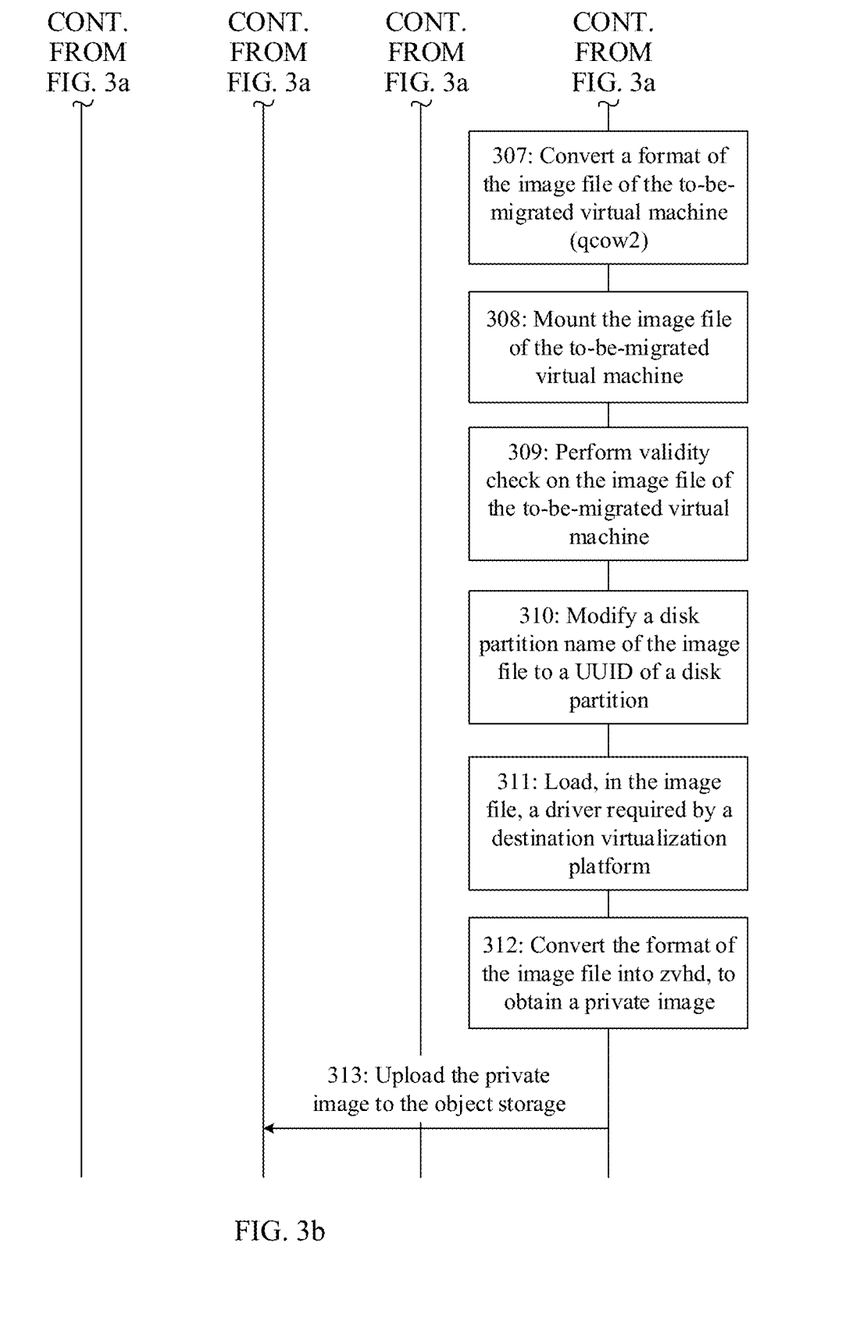

FIG. 3a and FIG. 3b are overall schematic flowcharts of a virtual machine migration method according to an embodiment of this application. The following further describes this embodiment of this application with reference to FIG. 3a and FIG. 3b. As shown in FIG. 3a and FIG. 3b, the method includes the following steps.

Step 301: A user exports an image file of a to-be-migrated virtual machine from a source virtualization platform. The source virtualization platform may be a VMware virtualization platform, a virtual server virtualization platform, a XEN virtualization platform, or a KVM virtualization platform. A format of the image file of the to-be-migrated virtual machine may be vhd, vmdk, qcow2, or raw.

Step 302: The user uploads the image file of the to-be-migrated virtual machine to an object storage.

Figure 4:
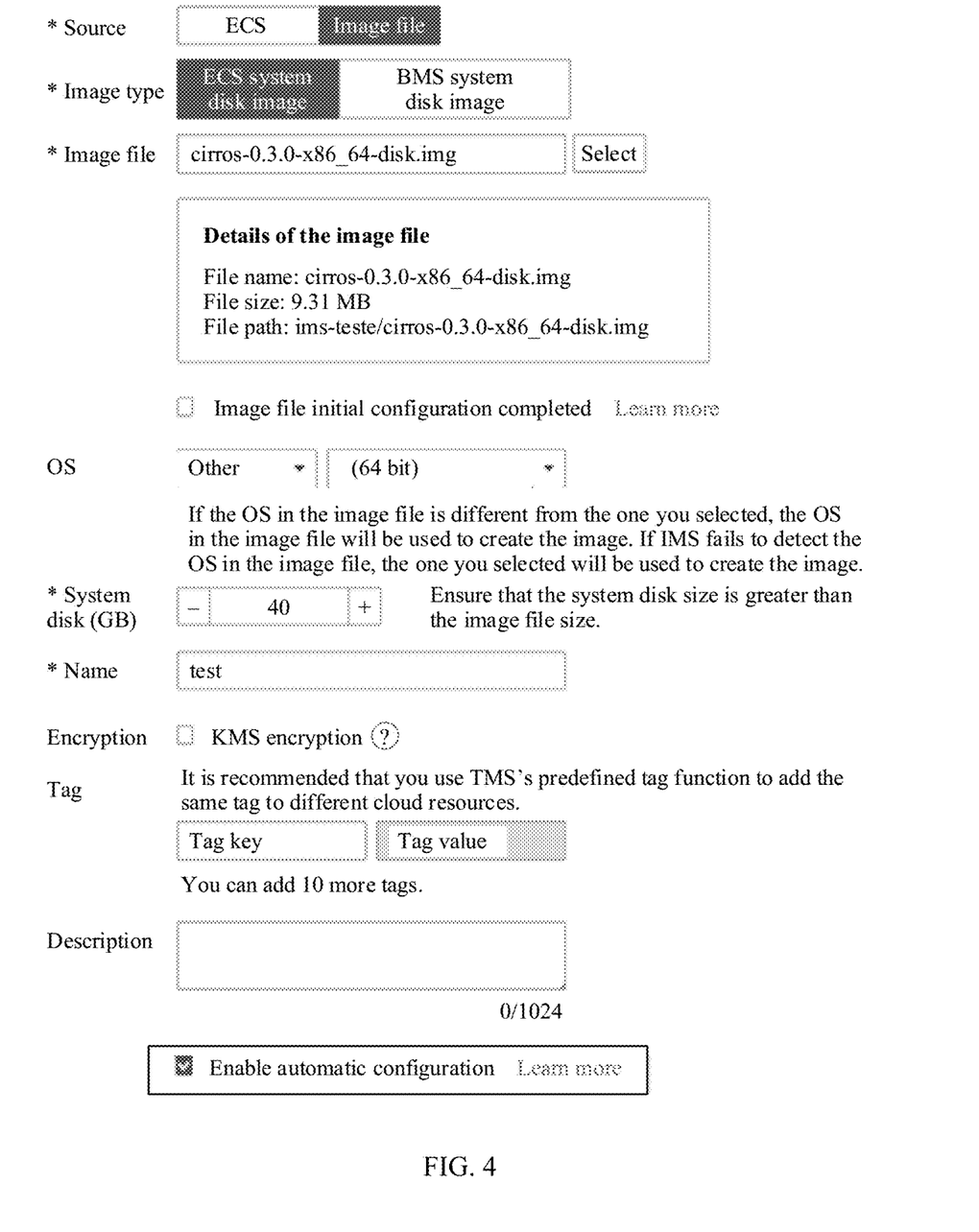
FIG. 4 is a schematic diagram of an interface of a management console.

Step 303: The user selects, on a management console, to import the image file of the to-be-migrated virtual machine (referring to content shown in the third row in FIG. 4), and selects to perform background automatic V2V processing (referring to content shown in the last row in FIG. 4).

Step 304: The management console sends first control information to a mirror management service, where the first control information is used to notify the mirror management service that the image file of the to-be-migrated virtual machine is uploaded to the object storage.

Step 305: After receiving the first control information, the mirror management service sends second control information to a conversion serving node, where the second control information is used to indicate the conversion serving node to convert the image file of the to-be-migrated virtual machine into a private image.

Step 306: After receiving the second control information, the conversion serving node downloads the image file of the to-be-migrated virtual machine from the object storage.

Step 307: The conversion serving node converts a format of the image file of the to-be-migrated virtual machine, for example, converts the format into qcow2. It may be understood that if the format of the image file of the to-be-migrated virtual machine is qcow2, step 307 may not be performed.

Step 308: The conversion serving node mounts the image file of the to-be-migrated virtual machine.

Step 309: The conversion serving node performs validity check on the image file of the to-be-migrated virtual machine, and if the validity check is passed, step 310 is performed; if the validity check is not passed, the process ends.

Step 310: The conversion serving node modifies a disk partition name of the image file to a UUID of a disk partition.

Step 311: The conversion serving node loads, in the image file, a driver required by a destination virtualization platform, for example, a XEN driver and a virtio driver.

Step 312: The conversion serving node converts the format of the image file into a preset format, for example, zvhd, by using a preset tool, to obtain the private image.

Step 313: The conversion serving node uploads the private image to the object storage.

In this way, sequentially, the private image in the object storage can be used to provision a virtual machine that runs on the destination virtualization platform.

It should be noted that a possible execution procedure is mainly described in FIG. 3a and FIG. 3b. For specific implementation of each step, refer to the related description in FIG. 2a. Details are not described herein again.

According to the virtualization migration method provided in this embodiment of the present invention, for a Linux virtual machine, disk partition names may be automatically unified as UUIDs in a migration process, and virtio drivers (including virtio_blk, virtio_scsi, virtio_net, virtio_pci, virtio_ring, and virtio) may be automatically injected in the migration process. For a Windows virtual machine, the XEN driver required for starting a XEN virtualization platform and the virtio driver required for starting a KVM virtualization platform can be automatically injected in the migration process. In addition, driver information can be automatically loaded to a Windows registry in the migration process, to ensure that the virtual machine is started from a disk. For a Windows operating system, a related service may further be set to automatically take effect in a startup process (for example, enabling a Windows PnP (Plug and Play) to automatically discover a device (no need to restart), so that corresponding optimization may automatically takes effect without logging in by the user, to meet a user habit of using a Windows server, and further enabling a Firstboot system service (rhsrvany), to ensure that all devices are ready (windows srvany)), further, a technology in which an import process is not affected by another application can also be used (for example, enabling pnp_wait.exe, and invoking CMP_WaitNoPendingInstallEvents, to avoid conflicts with another startup program when the system starts), to ensure a success rate of a process of offline importing driven by the Windows.

It may be understood that, to implement corresponding functions, the devices in the foregoing embodiments may include corresponding hardware structures and/or software modules for performing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 5:
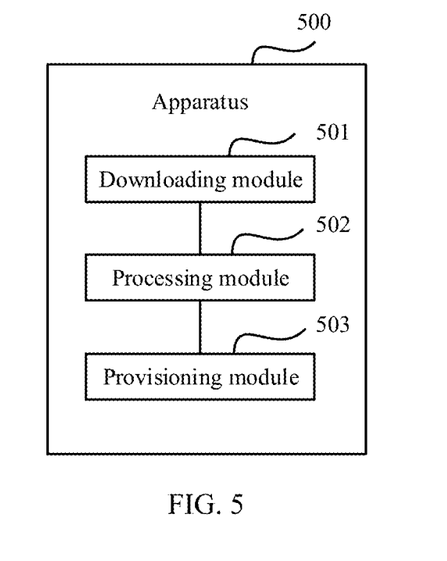
FIG. 5 is a schematic diagram of a structure of a virtual machine migration apparatus according to an embodiment of this application.

When an integrated unit is used, FIG. 5 is a possible example block diagram of an apparatus according to an embodiment of the present invention. The apparatus 500 may be configured to implement various possible designs in the foregoing method embodiments, and the apparatus 500 may exist in a form of software. The apparatus 500 may include a downloading module 501, a processing module 502, and a provisioning module 503. The processing module 502 may be a processor or a controller, for example, may be a general-purpose central processing unit (CPU). The processing module 502 may implement or execute various example logical blocks (as shown in FIG. 2a and FIG. 2b) described with reference to content disclosed in the present invention. Alternatively, the processor may be a combination of processors implementing a computing function, for example, a combination of one or more microprocessors.

Figure 6:
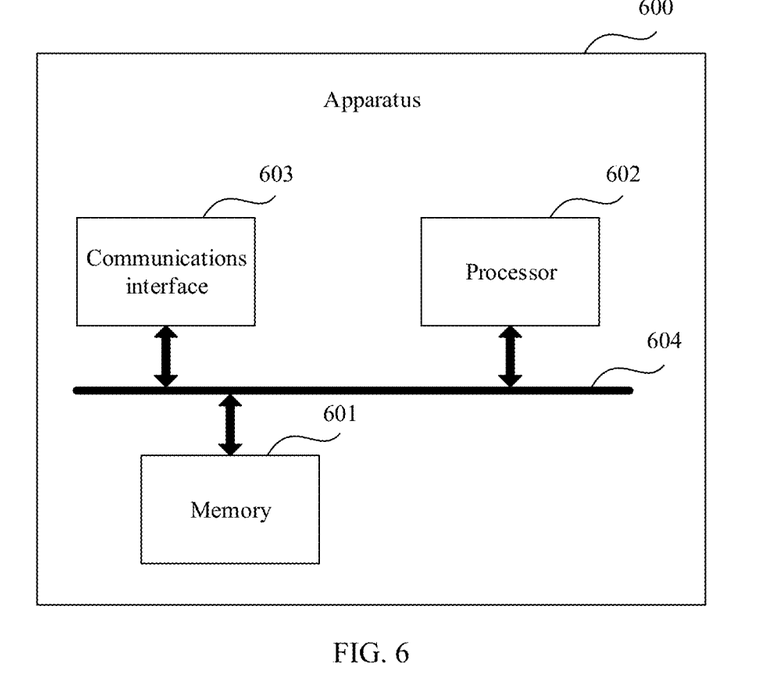
FIG. 6 is a schematic diagram of a structure of another virtual machine migration apparatus according to an embodiment of this application.

FIG. 6 is a schematic diagram of a virtual machine migration apparatus according to this application. The apparatus 600 includes a processor 602, a communications interface 603, and a memory 601. Optionally, the apparatus 600 may further include a bus 604. The communications interface 603, the processor 602, and the memory 601 may be connected to each other by using a bus 604. The bus 604 may be a peripheral component interconnect (PCI) bus, an extended industry standard architecture (EISA) bus, or the like. The bus 604 may be classified into an address bus, a data bus, a control bus, and the like. For ease of representation, only one thick line is used to represent the bus in FIG. 6, but this does not mean that there is only one bus or only one type of bus.

The processor 602 may be a CPU, a microprocessor, an ASIC, or one or more integrated circuits configured to control program execution in the solutions of this application.

The communications interface 603 is configured to communicate with another device or a communications network by using any apparatus such as a transceiver, The memory 601 may be a read-only memory (ROM) or another type of static storage device that can store static information and instructions, or random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 601 is not limited thereto. The memory may exist independently, and is connected to the processor by the communications line 604. Alternatively, the memory may be integrated with the processor.

The memory 601 is configured to store a computer-executable instruction for executing the solutions of this application, and the processor 602 controls the execution. The processor 602 is configured to execute the computer-executable instruction stored in the memory 601, to implement the method provided in the foregoing embodiments of this application.

Optionally, in this embodiment of this application, the computer-executable instruction may also be referred to as application program code. This is not specifically limited in this embodiment of this application.

An embodiment of this application further provides a computer program product. The computer program product includes a computer software instruction, and the computer software instruction may be loaded by the processor to implement the method in the procedure shown in FIG. 2a, FIG. 2b, or FIG. 3a and FIG. 3b in this application.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems". Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with another hardware, or may also use another allocation form, such as by using the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A virtual machine migration method, wherein the method comprises:
    downloading an image file of a to-be-migrated virtual machine from an object storage (OBS);
    performing a validity check on information about the image file, the information about the image file comprises a size of the image file and a system disk size of the image file; and
    based on the validity check passing, starting a preset command to process the image file, to obtain a private image corresponding to the image file, wherein the preset command is configured based on a difference between a source virtualization platform and a destination virtualization platform, the source virtualization platform is a virtualization platform on which the to-be-migrated virtual machine is located before migration, and the destination virtualization platform is a virtualization platform to which the to-be-migrated virtual machine is to be migrated; and
    provisioning, using the private image, a virtual machine that runs on the destination virtualization platform,
    wherein the starting of the preset command to process the image file comprises:
    querying the image file using a blkid command to obtain a universally unique identifier (UUID) of a disk partition;
    modifying the disk partition name of the image file to the UUID of the disk partition; and
    converting a format of the image file into a preset format.

2. The method according to claim 1, wherein an operating system of the to-be-migrated virtual machine is a Linux operating system; and
    the starting a preset command to process the image file further comprises:
    when it is detected that an initrd file of the image file does not comprise a driver file required by the destination virtualization platform, loading, in the initrd file of the image file, the driver file required by the destination virtualization platform.

3. The method according to claim 1, wherein an operating system of the to-be-migrated virtual machine is a Windows operating system; and
    the starting a preset command to process the image file further comprises:
    offline importing a driver file required by the destination virtualization platform into a registry of the image file.

4. The method according to claim 1, wherein
    the performing the validity check on the information about the image file includes determining whether the size of the image file exceeds a first preset range and determining whether the system disk size exceeds a second preset range.

5. The method according to claim 1, wherein
    the source virtualization platform comprises any one of a VMware virtualization platform, a virtual server virtualization platform, an open-source code virtual machine monitor (XEN) virtualization platform, or a kernel-based virtual machine (KVM) virtualization platform; and
    the destination virtualization platform comprises one or both of the XEN virtualization platform and the KVM virtualization platform.

6. A virtual machine migration apparatus, comprising a processor and a memory, wherein
    the memory is configured to store a computer-executable instruction; and
    the processor is configured to execute the computer-executable instruction stored in the memory, wherein execution of the computer-executable instruction causes the processor to:
    download an image file of a to-be-migrated virtual machine from an object storage (OBS);
    perform a validity check on information about the image file, the information about the image file comprises a size of the image file and a system disk size of the image file; and
    based on the validity check passing, start a preset command to process the image file, to obtain a private image corresponding to the image file, wherein the preset command is configured based on a difference between a source virtualization platform and a destination virtualization platform, the source virtualization platform is a virtualization platform on which the to-be-migrated virtual machine is located before migration, and the destination virtualization platform is a virtualization platform to which the to-be-migrated virtual machine is to be migrated; and provision, using the private image, a virtual machine that runs on the destination virtualization platform, wherein execution of the computer-executable instruction further causes the processor to:

query the image file using a blkid command to obtain a universally unique identifier (UUID) of a disk partition;

modify the disk partition name of the image file to the UUID of the disk partition; and convert a format of the image file into a preset format.

7. The apparatus according to claim 6, wherein an operating system of the to-be-migrated virtual machine is a Linux operating system; and execution of the computer-executable instruction further causes the processor to:

when it is detected that an initrd file of the image file does not comprise a driver file required by the destination virtualization platform, load, in the initrd file of the image file, the driver file required by the destination virtualization platform.

8. The apparatus according to claim 6, wherein an operating system of the to-be-migrated virtual machine is a Windows operating system; and execution of the computer-executable instruction further causes the processor to:

offline import a driver file required by the destination virtualization platform into a registry of the image file.

9. The apparatus according to claim 6, wherein execution of the computer-executable instruction causes the processor to:

perform the validity check on the information about the image file by determining whether the size of the image file exceeds a first preset range and determining whether the system disk size exceeds a second preset range.

10. The apparatus according to claim 6, wherein the source virtualization platform comprises any one of a VMware virtualization platform, a virtual server virtualization platform, an open-source code virtual machine monitor (XEN) virtualization platform, or a kernel-based virtual machine (KVM) virtualization platform; and the destination virtualization platform comprises one or both of the XEN virtualization platform and the KVM virtualization platform.

11. A non-transitory computer-readable storage medium, wherein the computer-readable storage medium stores an instruction, and when the instruction is run on a computer, the computer is enabled to perform a virtual machine migration method, comprising:

downloading an image file of a to-be-migrated virtual machine from an object storage (OBS);

performing a validity check on information about the image file, the information about the image file comprises a size of the image file and a system disk size of the image file; and based on the validity check passing, starting a preset command to process the image file, to obtain a private image corresponding to the image file, wherein the preset command is configured based on a difference between a source virtualization platform and a destination virtualization platform, the source virtualization platform is a virtualization platform on which the to-be-migrated virtual machine is located before migration, and the destination virtualization platform is a virtualization platform to which the to-be-migrated virtual machine is to be migrated; and provisioning, using the private image, a virtual machine that runs on the destination virtualization platform, wherein the starting of the preset command to process the image file comprises:

querying the image file using a blkid command to obtain a universally unique identifier (UUID) of a disk partition;

modifying the disk partition name of the image file to the UUID of the disk partition; and converting a format of the image file into a preset format.

* * * * *

UNITED STATES PATENT AND TRADEMARK OFFICE
CERTIFICATE OF CORRECTION

PATENT NO. : 12,056,519 B2  
APPLICATION NO. : 17/217519  
DATED : August 6, 2024  
INVENTOR(S) : Lin et al.

Page 1 of 1

It is certified that error appears in the above-identified patent and that said Letters Patent is hereby corrected as shown below:

On the Title Page (71) Applicant: reads as "Huawei Technologies Co., Ltd., Shenzhen (CN)" should read as -- Huawei Cloud Computing Technologies Co., Ltd., Gui'an New District (CN) --.

Signed and Sealed this  
Sixth Day of May, 2025

Coke Morgan Stewart  
*Acting Director of the United States Patent and Trademark Office*